Oct. 15, 1935.  G. W. BAUGHMAN  2,017,666
ELECTRIC BRAKE CONTROL
Filed Nov. 11, 1933
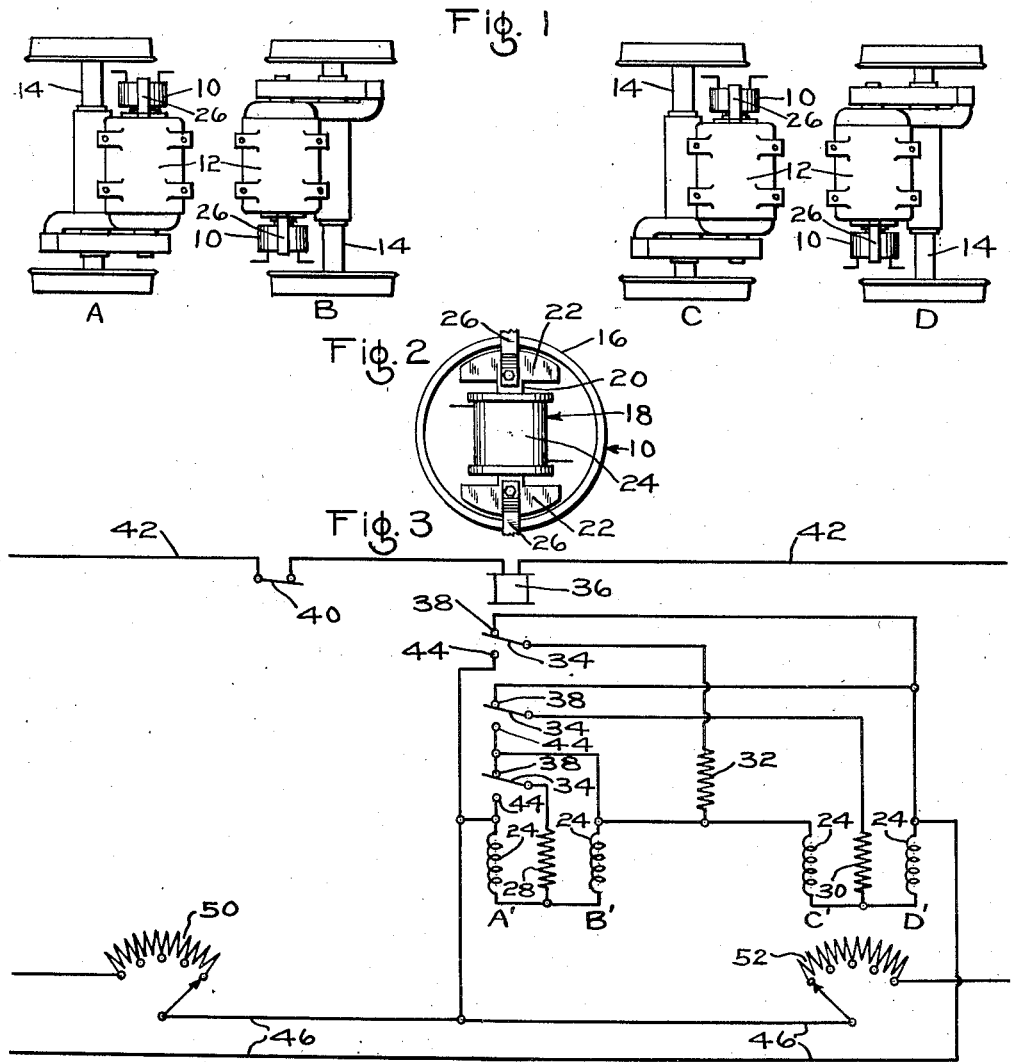
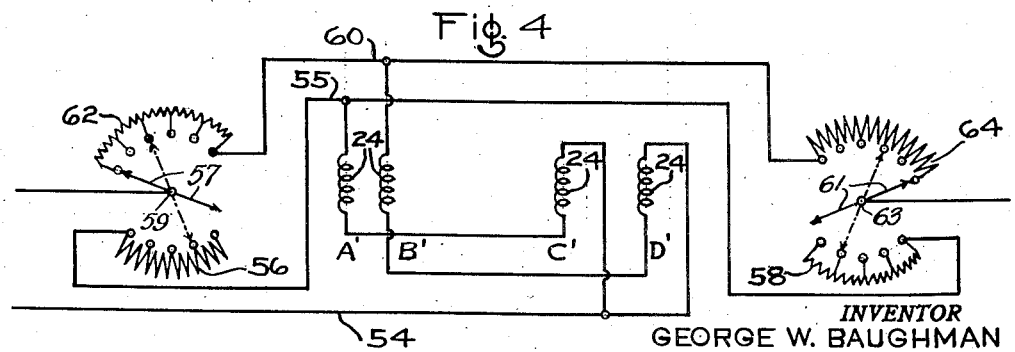
INVENTOR
GEORGE W. BAUGHMAN
BY Wm. A. Cady
ATTORNEY Patented Oct. 15, 1935

2,017,666

UNITED STATES PATENT OFFICE 2,017,666

ELECTRIC BRAKE CONTROL

George W. Baughman, Edgewood, Pa., assignor to The Westinghouse Air Brake Company, Wilmerding, Pa., a corporation of Pennsylvania Application November 11, 1933, Serial No. 697,632

17 Claims. (Cl. 188—2)

This invention relates to vehicle brakes, and more particularly to a system of brake control in which the brakes of a vehicle are controlled to produce different braking effects on different axles of the vehicle.

When the brakes of a vehicle are applied the vehicle decelerates in speed, and during this deceleration in speed the force of inertia causes the vehicle to tilt forward, with the result that a greater load is imposed on the front axles of the vehicle than on the rear axles, the difference in load depending upon the rate of deceleration. As this tilting action generally occurs when braking all types of railway or similar vehicles, the maximum degree of braking force with which the brakes in the now commonly employed brake systems associated with these vehicles may be applied, is limited to that which will not cause the rear wheels to skid. The maximum possible braking effort on the front wheels cannot therefore be practically utilized, with the result that vehicles equipped with such brake equipment are not brought to a stop in the shortest possible time.

It is a general object of my invention to provide a system of controlling brakes of the electro-dynamic type in a manner such that the degree of braking effort produced by the brakes on the axles of a vehicle more nearly corresponds with the load imposed on the axles, so that a vehicle may be brought to a stop in the shortest possible time and without shock.

Another object is to provide a system of this character in which ordinary electro-dynamic brakes, as for example brakes of the eddy current type, are used in conjunction with simple control devices to effect the desired results.

Another object is to provide a system of this character effective for both directions of travel of a vehicle.

Other objects will be apparent from the following description of the embodiments of my invention illustrated in the attached drawing, in which, Fig. 1 is a diagrammatic view of one arrangement of eddy current brakes in connection with the axles of a vehicle.

Fig. 2 is a somewhat diagrammatic view of the essential elements of one type of eddy current brake.

Fig. 3 is a schematic wiring diagram illustrating the connections of the essential elements for the control of braking on each axle of a vehicle.

Fig. 4 illustrates similar connections for the control of braking on each truck of a vehicle.

Referring now principally to Figs. 1 to 3, the embodiment there illustrated comprises essentially a plurality of eddy current brakes 10 associated with motors 12 having a driving relation with axles 14 adapted to support a vehicle. The eddy current brakes 10 are electrically interconnected and current supplied and controlled thereto as will be later described in connection with Fig. 3.

Each eddy current brake comprises a hollow, cup-like rotor 16, which in this embodiment is indicated as being rigidly secured to the shaft of the associated motor 12, although it may be secured to any part which rotates as the vehicle moves. Mounted within the rotor 16 is a stator 18 comprising a core member 20 terminating in pole pieces 22. Disposed on the core member 20 is an insulated winding 24. The pole pieces 22 have faces corresponding to and in spaced relation with the inside periphery of the rotor 16, and have an axial depth substantially coextensive with that of the annular portion of the rotor 16. The stator 18 may be supported from any convenient rigid surface, as for example the frame or housing of the motor 12, by non-magnetic brackets 26.

An eddy current brake 10 is preferably associated with each axle of a vehicle, for example such as is indicated in Fig. 1, where there is intended to be four axles for a vehicle, each axle 14 having its own driving motor 12, with which a brake 10 is associated. For convenience these axles are designated from left to right by the letters A, B, C and D, and in Fig. 3 the windings 24 corresponding to the brakes associated with each of these axles are similarly designated by the corresponding letters A', B', C' and D'.

For controlling the supply of current to each of the windings 24, and hence the relative degree of braking effect produced by each brake, there are provided resistance devices 28, 30, and 32, connected to contact arms 34 of relay 36. Contact arms 34 are adapted to be moved upwardly into contact with contacts 38 when relay 36 is energized, as by closing of switch 40, which causes current to be supplied to relay 36 from a suitable source (not shown) through conductors 42. When relay 36 is deenergized, as when switch 40 is opened, contact arms 34 drop and contact with contacts 44. As will be explained more fully later, relay 36 is energized only when the vehicle is traveling in one direction, and is always deenergized when the vehicle is traveling in an opposite direction.

Current is supplied to the windings 24 from a trolley and track, or other means, through conductors 46, and may be controlled from one end of the vehicle by rheostat 50 and from the other end by rheostat 52, the rheostat not in use at a given time being cut out of circuit.

In operation, when it is desired to retard motion of a vehicle equipped with the embodiment of my improved braking system as heretofore illustrated and described, current is supplied to the windings 24 through conductors 46 to a degree in accordance with the degree of braking desired. When thus energized, the windings 24 will produce a magnetic flux which will generate eddy currents in the rotor 16 to produce a braking effect on the vehicle, in a manner well known to those skilled in the art. If it is assumed that the vehicle is traveling in a direction such that the axles in Fig. 1 are moving to the left, then as the vehicle decelerates, a greater load will be imposed upon axle A than upon axle B, a greater load on axle B than on axle C, and a greater load on axle C than on axle D.

To produce a braking effect on these axles closely in accordance with these loads, switch 40 is closed simultaneously with the supply of current to the windings 24, thus energizing relay 36 and causing the contact arms 34 to move upwardly to engage the contacts 38, as shown. When this takes place, resistance device 28 is shunted across the winding 24 of brake B', resistance device 30 is shunted across the winding 24 of brake D', and resistance device 32 is shunted across the series combination of the windings 24 of brakes C' and D'. It will be seen, therefore, that more current will flow in brake A' winding than in brake B' winding, that more current will flow in brake B' winding than in brake C' winding, and that more current will flow in brake C' winding than in brake D' winding, due to the resistance device 28 diverting some of the current around the brake B' winding, the resistance device 32 diverting some of the current around both the windings of brakes C' and D', and the resistance device 30 diverting some of the current around the brake D' winding.

Since the braking effect produced by each brake is proportional to the current in its winding, it will be obvious that by properly proportioning the resistance values of the resistance devices 28, 30 and 32, the braking effect produced on each axle will more nearly correspond with the load on each axle than when the brake windings are energized alike, and that the maximum possible braking effect can then be produced on each axle to bring the vehicle to a stop in the shortest possible time.

As the speed of the vehicle approaches close to zero, the effectiveness of the eddy current brakes will decrease, and a friction brake may be used to bring the vehicle to a stop, such for example in the manner as described in my copending application for Electric brake devices, filed November 7, 1933, and having Serial No. 696,981.

If the vehicle is traveling in a direction opposite to that assumed, then the loads on the axles will progressively decrease from the right to the left when the vehicle is decelerating. The switch 40 is then held open, thereby maintaining relay 36 deenergized, so that contact arms 34 drop to their downmost position and contact with contacts 44. Resistance device 28 is then shunted across the winding of brake A', resistance device 32 is shunted across the series combination of the windings of brakes A' and B', and resistance device 30 is shunted across the winding of brake C'. From what has already been said, it will be obvious that the brakes will now produce braking effects on the axles corresponding closely with the load on the axles for this direction of travel of the vehicle, similar to that described for the opposite direction of travel.

In some vehicles the trucks tilt more than does the vehicle, in which case it is not necessary to produce different braking effects on each axle of the vehicle to secure the maximum, or very nearly the maximum braking effect, but a like result can be obtained by producing different braking effects on the axles of each truck only. In Fig. 4 I have shown a simple method for accomplishing this, using by way of illustration the same general arrangement of apparatus as shown in Fig. 1, but connecting the windings 24 of the brakes in a different manner.

If the axles A and B be considered as being associated with one truck and the axles C and D with the other truck of a two truck vehicle, then windings 24 of brakes A' and C' are connected in series and receive current from conductors 54 and 55 through rheostat device 56 at one end of the vehicle, or rheostat device 58 at the other end of the vehicle. Similarly, the windings 24 of brakes B' and D' are connected in series and receive current from conductors 54 and 60 through rheostat device 62 at one end of the vehicle, or rheostat device 64 at the other end of the vehicle. The arms 57 of the rheostat devices 56 and 62 are rigidly connected together at 59, and, the arms 61 of the rheostat devices 58 and 64 are similarly connected at 63, so that when the arm of one device is moved the arm of the other is correspondingly moved the same degree. It is to be understood that the resistance between steps of the rheostat device 62 are greater than that for the steps of the rheostat device 56, so that for a given corresponding movement of the arms of the two rheostats, as for example to the position shown in dot and dash lines, a greater resistance is always connected in series with the B' and D' winding combination than is connected in series with the A' and C' winding combination. In a similar manner the resistance between steps of the rheostat device 58 are greater than between the steps of the rheostat device 64, so that when the windings are controlled at that end of the vehicle a greater resistance is always connected in series with the A' and C' winding combination than is connected in series with the B' and D' winding combination.

In operation, when a vehicle having tiltable trucks and equipped with the apparatus described is decelerated, as by an application of the brakes, the front axle of each truck, as for example the A and C axles in this case, receive a greater load than do the rear axles, as the B and D axles in this case. If the direction of travel of the vehicle is such that the apparatus described is considered as moving to the left, then the supply of current to the brake windings is controlled by the rheostat devices 56 and 62. Since the resistance of the device 62 is always greater than that of the device 56, less current will be supplied to the brake windings of brakes B' and D'. As a consequence, less braking effort will be produced on these axles than on the axles A' and C'. The values of resistance in the two devices 56 and 62 are made such, that the braking effects produced by the two brake combinations correspond closely to the loads on the respective axle combinations.

If the vehicle is traveling in an opposite direction, the control of the current supplied to the brake windings 24 will be by the rheostat devices 58 and 64, and it will then be obvious that similar results to those just described will be obtained for this direction of motion.

While several embodiments of my invention have been described in detail, it is not my intention to limit its scope to these embodiments or otherwise than by the terms of the appended claims.

Having now described my invention, what I claim as new and desire to secure by Letters Patent, is:

1. In a vehicle brake system, the combination with a plurality of electrodynamic brake devices, of electrically operated contact means having an energized position and a deenergized position, and means rendered operable by said means in one of said positions for causing some of said brake devices to produce a greater braking effect than other of said brake devices.

2. In a vehicle brake system, the combination with a front vehicle axle, a rear vehicle axle and electrodynamic brake devices associated with said axles, of a relay, means for energizing and deenergizing said relay, and means controlled by said relay for causing the brake device associated with said front axle to produce a greater braking effect than the brake device associated with said rear axle.

3. In a vehicle brake system, the combination with a front vehicle axle, a rear vehicle axle and electrodynamic brake devices associated with said axles, of a relay, means for energizing and deenergizing said relay, and means rendered operable when said relay is energized for causing one of said brake devices to produce a greater braking effect than the other of said brake devices and operable when said relay is deenergized for producing the reverse effect.

4. In a vehicle brake system, the combination with a front vehicle axle, a rear vehicle axle and an electrodynamic brake device associated with each of said axles, of a relay, means for energizing and deenergizing said relay, and means controlled by said relay and rendered operable when said relay is energized for causing the brake device associated with said front axle to produce a greater braking effect than the brake device associated with said rear axle and operable when said relay is deenergized for causing the brake device associated with said rear axle to produce a greater braking effect than the brake device associated with said front axle.

5. In a vehicle brake system, the combination with a plurality of vehicle axles and electrodynamic brake devices associated with said axles, each of said brake devices having an exciting winding, of electrically operated contact means, means for effecting operation of said contact means, and means controlled by said contact means and rendered operable when said contact means is operated for by-passing current around some of said brake windings.

6. In a vehicle brake system, the combination with a plurality of axles and electrodynamic brake devices associated with said axles, each of said brake devices having an exciting winding, of a relay having a plurality of contacts, some of said contacts being closed when said relay is deenergized and other of said contacts being closed when said relay is energized, means for energizing and deenergizing said relay, a plurality of resistance devices, and circuits connecting said resistance devices and said exciting windings to said relay contacts, said circuits being arranged such that when said relay is energized said resistance devices are shunted across certain of said exciting windings and when said relay is deenergized said resistance devices are shunted across other of said exciting windings.

7. In a vehicle brake system, the combination with a plurality of electrodynamic brake devices disposed longitudinally of a vehicle, each of said brake devices having an exciting winding, of an electroresponsive device having a plurality of contacts, a plurality of resistance devices, and circuit means connecting said resistance devices and exciting windings to said contacts, whereby when said electroresponsive device is energized said resistance devices are connected to said exciting winding to cause the brake devices adjacent the front end of said vehicle to produce a greater braking effect than the brake devices adjacent the rear end of said vehicle.

8. In a vehicle brake system, the combination with a plurality of electrodynamic brake devices disposed longitudinally of a vehicle, each of said brake devices having an exciting winding, of a relay having a plurality of contacts, certain of said contacts being closed when said relay is deenergized and certain other of said contacts being closed when said relay is energized, means for energizing and deenergizing said relay, a plurality of resistance devices, and circuit means connecting said resistance devices and said exciting windings to said relay contacts, said contacts being operable when said relay is energized to connect one of said resistance devices in parallel with the exciting winding of at least one of said brake devices adjacent the front end of the vehicle and to connect another of said resistance devices in parallel with the exciting winding of at least two of said brake devices adjacent the rear end of said vehicle.

9. In a vehicle brake system, the combination with two front vehicle axles, two rear vehicle axles and electrodynamic brake devices associated with each of said axles, each of said brake devices having an exciting winding, of a resistance device, a relay having a plurality of contacts, certain of said contacts being closed when said relay is energized and certain other of said contacts being closed when said relay is deenergized, means for energizing and deenergizing said relay, and circuits connecting said resistance device and said exciting windings to said contacts, whereby when said relay is deenergized said resistance device is shunted across said windings on the brake devices associated with said two front axles and when said relay is energized said resistance device is shunted across said windings on the brake devices associated with the two rear axles.

10. In a vehicle brake system, the combination with two front axles, two rear axles and electrodynamic brake devices associated with each of said axles, each of said brake devices having an exciting winding, of a relay having a plurality of contacts, means for energizing and deenergizing said relay, a plurality of resistance devices, and circuits connecting said resistance devices and said exciting windings to said relay contacts, said contacts being operable when said relay is energized to connect one of said resistance devices in shunt with an exciting winding on one of said brake devices associated with one of said front axles and to connect another of said resistance devices in shunt with an exciting winding on one of said brake devices associated with one of said rear axles and to connect still another of said resistance devices in shunt with the series combination of the two exciting windings on the two brake devices associated with both of the rear axles, said contacts being operable when said relay is deenergized to connect said first mentioned resistance device in shunt with the exciting winding of the brake device associated with the other of said front axles and to connect the second mentioned resistance device in shunt with the exciting winding of the brake device associated with the other of said rear axles and to connect the third mentioned resistance device in shunt with the series combination of the two exciting windings of the brake devices associated with the two front axles.

11. In a vehicle brake system, the combination with a plurality of electrodynamic brake devices disposed longitudinally of the vehicle, each of said brakes having an exciting winding, of a circuit for supplying current to said windings, a rheostat for controlling said current at the front end of the vehicle, a rheostat for controlling said current at the rear end of the vehicle, a plurality of resistance devices, a relay having contacts connected to said resistance devices and to said windings and being operable to connect said resistance devices and windings so that the braking effect produced by said braking devices progressively decreases from the front end of said vehicle toward the rear end of said vehicle, and means for controlling operation of said relay.

12. In a vehicle brake apparatus, the combination with two front axles, two rear axles and electrodynamic brake devices associated with each of said axles, each of said brake devices having an exciting winding, means for connecting each of the windings of a brake device associated with a front axle in series with a winding of a brake device associated with a rear axle to form series combinations, and means for effecting a greater supply of current to one of said series combinations than to the other of said series combinations.

13. In a vehicle brake system, the combination with two front vehicle axles and two rear vehicle axles, of electric brake devices associated with each of said axles, means connecting the brake device associated with the forward front axle with the brake device associated with the forward rear axle to form one combination, means for connecting the brake device associated with the rearmost front axle with the brake device associated with the rearmost rear axle to form another combination, means for supplying current to both of said combinations, and means for preventing equal current from being supplied to both of said combinations.

14. In a vehicle brake system, the combination with two front axles and two rear axles, of electric brake devices associated with each of said axles, means for connecting the brake device associated with the frontmost front axle in series with the brake device associated with the frontmost rear axle, means for connecting the brake device associated with the rearmost front axle in series with the brake device associated with the rearmost rear axle, a circuit including a resistance device for controlling the supply of current to said first series combination, a second circuit including a second resistance device for controlling the supply of current to said second series combination, and means interlocking said resistance devices and effective in causing a greater resistance to always be connected in circuit with said second series combination than in circuit with said first series combination.

15. In a vehicle brake system, the combination with a plurality of eddy current brake devices, each of said devices having an exciting winding and said windings being connected in series groups, of circuits for supplying current to said windings, and resistance devices in said circuits operable to control separately the current supplied to said winding groups, said resistance devices being interlocked whereby the operation of one of said devices to vary the resistance in one of said circuits effects operation of the other of said devices to vary the resistance in the other of said circuits.

16. In a vehicle brake system, the combination with a plurality of eddy current brake devices, each of said devices having an exciting winding, and said windings being connected in series groups, of circuits for supplying current to each of said groups, a variable resistance device operable to control the supply of current to one of said groups, a second variable resistance device operable to control the supply of current to another of said groups, and means interlocking said resistance devices whereby the resistance in circuit with one of said groups is always greater than the resistance in circuit with the other of said groups.

17. In a vehicle brake system, in combination, a plurality of electric brake devices, means for controlling the supply of current to said devices, and means effective for both directions of travel of the vehicle for preventing at all times equal distribution of current to all of said brake devices regardless of operation of said control means.

GEORGE W. BAUGHMAN.